US006692577B2

(12) United States Patent
Heikkilä et al.

(10) Patent No.: US 6,692,577 B2
(45) Date of Patent: Feb. 17, 2004

(54) PROCESS FOR PURIFYING MALTOSE

(75) Inventors: Heikki Heikkilä , Espoo (FI); Mika Mänttäri, Lappeenranta (FI); Mirja Lindroos, Kirkkonummi (FI); Marianne Nyström, Lappeenranta (FI)

(73) Assignee: Danisko Sweeteners Oy, Espoo (FI)

( * ) Notice: Subject to any disclaimer, the term of this patent is extended or adjusted under 35 U.S.C. 154(b) by 16 days.

(21) Appl. No.: 10/034,597

(22) Filed: Dec. 28, 2001

(65) Prior Publication Data

US 2002/0158021 A1 Oct. 31, 2002

(30) Foreign Application Priority Data

Dec. 28, 2000 (FI) ............................................ 20002866

(51) Int. Cl.[7] ......................... C08B 30/00; B01D 15/00; B01D 15/08; B01D 61/00; C13D 3/12

(52) U.S. Cl. ............................ 127/34; 127/42; 127/53; 127/55; 210/635; 210/650; 210/651; 210/656; 210/659; 210/198.2; 426/658

(58) Field of Search ............................. 127/34, 42, 53, 127/55; 210/635, 650, 651, 656, 659, 198.2; 426/658

(56) References Cited

U.S. PATENT DOCUMENTS

| | | | | |
|---|---|---|---|---|
| 3,817,787 A | | 6/1974 | Von Hertzen et al. | 127/46 B |
| 4,408,041 A | | 10/1983 | Hirao et al. | 536/4.1 |
| 4,410,368 A | * | 10/1983 | Takasaki et al. | 127/38 |
| 4,429,122 A | | 1/1984 | Zupancic | 536/124 |
| 4,487,198 A | | 12/1984 | Miyake et al. | 127/46.3 |
| 4,511,654 A | | 4/1985 | Rohrbach et al. | 435/95 |
| 5,651,829 A | * | 7/1997 | Caboche | 127/32 |
| 5,853,487 A | | 12/1998 | Tang et al. | 127/32 |
| 5,869,297 A | | 2/1999 | Binder et al. | 435/105 |
| 6,126,754 A | | 10/2000 | Duflot | 127/55 |
| 6,129,788 A | * | 10/2000 | Liaw et al. | 127/40 |
| 6,136,571 A | * | 10/2000 | Liaw et al. | 435/96 |
| 6,184,003 B1 | * | 2/2001 | Caboche | 435/105 |
| 6,274,355 B1 | * | 8/2001 | Duflot et al. | 435/99 |
| 6,303,346 B1 | | 10/2001 | Liaw et al. | 435/96 |
| 6,346,400 B1 | | 2/2002 | Caboche | 435/95 |
| 6,348,264 B1 | * | 2/2002 | Abou-Nemeh et al. | 428/402 |
| 2002/0012973 A1 | | 1/2002 | Antrim et al. | 435/100 |
| 2002/0153317 A1 | * | 10/2002 | Heikkila et al. | 210/650 |

FOREIGN PATENT DOCUMENTS

| | | | | |
|---|---|---|---|---|
| EP | 0 452 238 A3 | | 10/1991 | |
| EP | 1 016 728 A2 | | 7/2000 | |
| JP | 51-98346 | | 8/1976 | |
| JP | 06237800 | * | 8/1994 | C13K/1/06 |
| WO | WO 99/28490 | * | 6/1999 | C12P/19/12 |
| WO | WO 02/053782 | * | 7/2002 | C13K/7/13 |

* cited by examiner

*Primary Examiner*—Mark L. Bell
*Assistant Examiner*—Patricia L. Hailey
(74) *Attorney, Agent, or Firm*—Scully, Scott, Murphy & Presser

(57) ABSTRACT

The invention relates to a process for purifying a maltose-containing liquor from a undesired impurities, such as maltotriose. The process of the invention is characterized by nanofiltering said liquor and recovering a purified maltose solution as the permeate.

43 Claims, No Drawings

PROCESS FOR PURIFYING MALTOSE

BACKGROUND OF THE INVENTION

The invention relates to a novel process for purifying maltose-containing liquors, such as maltose syrups.

Maltose is a valuable raw material in the production of maltitol (α(1→4)glucosylsorbitol), which is a sugar alcohol generally used as a sweetening agent in low-caloric, dietary and low-cariogenic foods, such as confectionary products and chewing gums. Maltitol is prepared in the form of crystalline maltitol or maltitol syrup.

Maltose is produced from a starch solution, which is first enzymatically hydrolyzed into a maltose syrup. For the production of maltitol, maltose syrup is catalytically hydrogenated to maltitol, whereafter the maltitol syrup is crystallized. The maltose syrup used as the starting material for the hydrogenation and crystallization contains varying levels of undesirable impurities, especially maltotriose. Maltotriose has a tendency to make the final maltose product unstable and hygroscopic. Furthermore, the presence of maltotriose may disturb the crystallization of maltose and maltitol. For preparing crystalline products of high purity, it is thus necessary to purify the maltose-containing syrup from maltotriose. Various methods, such as hydrolysis with enzymes, chromatography and ultrafiltration or combinations thereof have been used for the purification of maltose syrups.

An enzymatic hydrolysis method for the production of maltose has been disclosed e.g. in U.S. Pat. No. 4,408,041 (Hayashibara). Chromatographic methods for the purification of maltose have been disclosed in U.S. Pat. Nos. 3,817,787 (Suomen Sokeri Oy) and 4,487,198 (Hayashibara), for example.

Ultrafiltration for the purification of liquors containing maltose and glucose have been described e.g. in U.S. Pat. No. 4,429,122 (UOP Inc.). This U.S. Patent discloses a process for the separation of a mono- or disaccharide, such as glucose and/or maltose, from polysaccharides by passing a mixture containing monosaccharides, disaccharides and polysaccharides through an ultrafiltration membrane. Polysaccharides are retained on the ultrafiltration membrane, while monosaccharides and disaccharides are permeated through the membrane. In this process, maltose and/or glucose are separated from oligosaccharides, but not from impurities having a smaller molar mass, such as maltotriose.

U.S. Pat. No. 4,511,654 (UOP Inc.) relates to a process for the production of a high glucose or maltose syrup by treating a glucose/maltose-containing feedstock with an enzyme selected from amyloglucosidase and β-amylase to form a partially hydrolyzed reaction mixture, passing the resultant partially hydrolyzed reaction mixture through an ultrafiltration membrane to form a retentate and a permeate, recycling the retentate to the enzyme treatment stage, and recovering the permeate including the high glucose or maltose syrup. Even in this process, the resulting glucose/maltose syrup is not free from impurities, such as maltotriose.

Japanese Patent Publication JP 51098346 A (Ajinomoto KK) discloses the preparation of high purity maltose by reacting gelatinized starch with β-amylase and ultrafiltering the solution thus obtained using a semipermeable membrane having a cut-off size of 5000 to 50000 g/mol, preferably 10000 to 30000 g/mol. A highly pure maltose is obtained as the filtrate.

Nanofiltration is a relatively new pressure-driven membrane filtration process, falling between reverse osmosis and ultrafiltration. Nanofiltration typically retains large and organic molecules with a molar mass greater than 300 g/mol. The most important nanofiltration membranes are composite membranes made by interfacial polymerisation. Aromatic polyamide membranes, polysulfone membranes, sulfonated polysulfone membranes, polyether sulfone membranes, sulfonated polyether sulfone membranes, polyester membranes and polypiperazine membranes are examples of widely used nanofiltration membranes. Inorganic and ceramic membranes can also be used for nanofiltration.

U.S. Pat. No. 5,869,297 (Archer Daniels Midland Co.) discloses a nanofiltration process for making dextrose. This process comprises nanofiltering a dextrose composition including as impurities higher saccharides, such as disaccharides and trisaccharides. A dextrose composition having a solids content of at least 99% dextrose is obtained. Crosslinked aromatic polyamide membranes have been used as nanofiltration membranes.

WO 99/28490 (Novo Nordisk AS) discloses a method of producing di- and oligosaccharide syrups by enzymatic reaction of saccharides followed by nanofiltration of the enzymatically treated saccharide solution to obtain as the retentate an oligosaccharide syrup containing disaccharides and higher saccharides. A thin film composite polysulfone membrane having a cut-off size less than 100 g/mol has been used as the nanofiltration membrane, for example. In one embodiment of the process, a liquefied starch solution of maltodextrins is used as the starting material for the enzymatic reaction and subsequent nanofiltration.

U.S. Pat. No. 6,126,754 (Roquette Freres) relates to a process for the manufacture of a starch hydrolysate with high dextrose content. In this process, a starch milk is subjected to enzymatic treatment to obtain a raw saccharifed hydrolysate. The hydrolysate thus obtained is then subjected to nanofiltering to collect as the nanofiltration permeate the desired starch hydrolysate with a high dextrose content.

BRIEF DESCRIPTION OF THE INVENTION

The purpose of the present invention is to provide a method for purifying a maltose-containing liquor from maltotriose using membrane filtration techniques. The process of the claimed invention is based on the use of nanofiltration.

In accordance with the present invention, complicated and cumbersome purification methods, such as chromatographic steps can be completely or partly replaced by less complicated nanofiltration membrane techniques. The process of the present invention can provide a maltose solution essentially free from undesired low molar-mass impurities, such as maltotriose.

DETAILED DESCRIPTION OF THE INVENTION

The invention relates to a process for purifying a maltose-containing liquor from maltotriose, wherein said maltose-containing liquor has a maltose content of at least about 55% by weight, based on dissolved dry solids, by nanofiltering said liquor and recovering as the permeate a maltose solution having an increased ratio of maltose to maltotriose.

In a typical embodiment of the invention, the process comprises recovering a maltose solution having a ratio of maltose to maltotriose of over 1.1 times, preferably over 5 times, more preferably over 10 times and most preferably over 20 times that of the starting liquor. Typically, the process comprises recovering a maltose solution having a ratio of maltose to maltotriose of 1.1. to 30 times, preferably 5 to 30 times, more preferably 10 to 30 times and most preferably 20 to 30 times that of the starting liquor.

The maltose content of the starting liquor is at least about 55% by weight, preferably at least about 80% by weight, based on dissolved dry solids. The maltose content is typically in the range of 55 to 90%, preferably 80 to 90% by weight, based on dissolved dry solids.

The separation of maltose from maltotriose can be regulated by varying the maltose content of the starting maltose-containing liquor.

The maltose-containing liquor to be treated by the process of the invention may be a maltose syrup, for example.

The dry substance content of the starting maltose-containing liquor is typically 5 to 50% by weight, preferably 8 to 25% by weight.

The maltose-containing liquor used as the starting material usually contains also monosaccharides, mainly glucose, in a typical amount of 10 to 95%, based on the maltose content. The starting liquor may also contain minor amounts of other monosaccharides. Furthermore, the starting maltose-containing liquor typically contains oligosaccharides and small amounts of ionic compounds, such as metal cations, e.g. sodium, potassium, calcium, magnesium and iron cations.

The maltose-containing liquor to be treated is typically obtained from a starch solution, which is typically hydrolyzed into a maltose syrup. The hydrolysis can be carried out with enzymes, for example.

The process of the invention may also comprise one or more pretreatment steps. The pretreatment before the nanofiltration is typically selected from ion exchange, ultrafiltration, chromatography, concentration, pH adjustment, filtration and combinations thereof. Before the nanofiltration, the starting liquor may be thus pretreated by ion exchange, ultrafiltration or chromatography, for example. Furthermore, a prefiltering step to remove the solid substances can be used before the nanofiltration. The pretreatment of the starting liquor may also comprise concentration, e.g. by evaporation. The pretreatment may also comprise crystallization, whereby the starting liquor may also be a mother liquor obtained from the crystallization of maltose.

The nanofiltration is typically carried out at a pH of 1 to 8, preferably 4 to 8, most preferably 4.5 to 7.0. If necessary, the pH of the starting liquor is adjusted to the desired value before nanofiltration.

The nanofiltration is typically carried out at a pressure of 10 to 50 bar, preferably 15 to 35 bar. A typical nanofiltration temperature is 5 to 95° C., preferably 30 to 60° C. The nanofiltration is typically carried out with a flux of 10 to 100 $l/m^2h$.

The separation of maltotriose from maltose can also be regulated by varying the pressure and temperature of the nanofiltration operation, besides varying the maltose content of the starting liquor mentioned above. As a rule, the higher the temperature and the pressure, the better separation is achieved.

The nanofiltration membrane used in the present invention can be selected from polymeric and inorganic membranes having a cut-off size of 100–2500 g/mol, preferably 500 to 2500 g/mol.

Typical polymeric nanofiltration membranes useful in the present invention include, for example, aromatic polyamide membranes, polysulfone membranes, sulfonated polysulfone membranes, polyether sulfone membranes, sulfonated polyether sulfone membranes, polyester membranes and polypiperazine membranes and combinations thereof. Cellulose acetate membranes are also useful as nanofiltration membranes in the present invention.

Typical inorganic membranes include $ZrO_2$- and $Al_2O_3$-membranes, for example.

Preferred nanofiltration membranes are selected from aromatic polyamide/polysulfone membranes and sulfonated polyether sulfone membranes. As specific useful membranes can be mentioned Desal G10 nanofiltration membrane (manufacturer Osmonics) and NTR-7450 nanofiltration membrane (manufacturer Nitto Denko), for example.

The nanofiltration membranes which are useful in the present invention may have a negative or positive charge. The membranes can be ionic membranes, i.e. they may contain cationic or anionic groups, but even neutral membranes are useful. The nanofiltration membranes may be selected from hydrophobic and hydrophilic membranes.

The typical form of nanofiltration membranes is a flat sheet form. The membrane configuration may also be selected e.g. from tubes, spiral membranes and hollow fibers. "High shear" membranes, such as vibrating membranes and rotating membranes can also be used.

Before the nanofiltration procedure, the nanofiltration membranes may be pretreated with water, alkaline detergents and/or ethanol, for example.

In a typical nanofiltration operation, the liquor to be treated is fed through the nanofiltration membrane using the temperature and pressure conditions described above. The liquor is thus fractionated into a low molar mass fraction including maltose (permeate) and a high molar mass fraction including the non-desired components of the starting maltose-containing liquor (retentate).

The nanofiltration equipment useful in the present invention comprises at least one nanofiltration membrane element dividing the feed into a retentate and permeate section. The nanofiltration equipment typically also include means for controlling the pressure and flow. The equipment may also include several nanofiltration membrane elements in different combinations, arranged in parallel or series.

The flux of the permeate varies in accordance with the pressure. In general, at a normal operation range, the higher the pressure, the higher the flux. The flux also varies with the temperature. An increase of the operating temperature increases the flux. However, with higher temperatures and with higher pressures there is an increased tendency for a membrane rupture. For inorganic membranes, higher temperatures and pressures and higher pH ranges can be used than for polymeric membranes.

The nanofiltration in accordance with the present invention can be carried out batchwise or continuously. The nanofiltration procedure can be repeated once or several times.

After nanofiltration, the maltose may be recovered from the permeate, e.g. by crystallization. The nanofiltered solution can be used as such for the crystallization, without further purification and separation steps. If desired, the nanofiltered maltose solution can be subjected to further purification, e.g. by chromatography, ion exchange, concentration by evaporation or reverse osmosis, or colour removal.

In the process of the present invention, the purified maltose solution obtained as the permeate is also as a rule enriched in glucose and deprived of oligosaccharides.

The process of the invention may comprise a further step of separating the glucose from the permeate. Glucose is typically separated by nanofiltration or chromatography.

The process of the invention may also comprise a further step of recovering a solution enriched in oligosaccharides as the retentate.

The invention also relates to a purified maltose product thus obtained. Furthermore, the invention relates to the use of the maltose product thus obtained for the preparation of maltitol in a crystalline form or in the form of a solution. For preparing maltitol, maltose thus obtained can be used either before or after the separation of glucose. The maltose product obtained by the process of the invention can be used in the form of a maltose solution or in a crystalline form after the crystallization of maltose.

Furthermore, the invention relates to the use of the maltose product obtained according to the process of the present invention for the preparation maltitol by the conversion of maltose to maltitol, for example by catalytic hydrogenation.

The invention also relates to the use of the maltose product obtained by the present invention in foodstuffs. In this embodiment of the invention, maltose is typically used in the form of maltose syrup or maltose crystals.

Preferred embodiments of the invention will be described in greater detail by the following examples, which are not construed as limiting the scope of the invention.

In the examples and throughout the specification and claims, the following definitions have been used:

RDS refers to the refractometric dry substance content, expressed as % by weight.

Flux refers to the amount (liters) of the solution that permeates through the nanofiltration membrane during one hour calculated per one square meter of the membrane surface, $l/(m^2h)$.

Retention refers to the proportion of the measured compound retained by the membrane. The higher the retention value, the less is the amount of the compound transferred through the membrane:

$$\text{Retention } (\%)=[(\text{Feed}-\text{Permeate})/\text{Feed}]\times 100$$

where "Feed" refers to the concentration of the compound in the feed solution (expressed e.g. in g/l) and "Permeate" refers to the concentration of the compound in the permeate solution (expressed e.g. in g/l).

The following membranes were used in the examples:

- NTR-7450 (a sulfonated polyethersulfone membrane having a cut-off size of 500 to 1000 g/mol, permeability (25° C.) of 9.4 $l/(m^2h$ bar), NaCl-retention of 51% (5 g/l), manufacturer Nitto Denko),
- Desal G10 (a thin film membrane of aromatic polyamide/polysulfone material having a cut-off-size of 2500 g/mol, permeability (25° C.) of 3.4 $/l(m^2h$ bar), NaCl-retention of 10%, retention of dextrane (1500 g/ml) of 95%, retention of glucose of 50%, manufacturer Osmonics),
- NF 200 (a polypiperazine membrane having a cut-off size of 200 g/mol, permeability (25° C.) of 7–8 $l/(m^2h$ bar), NaCl-retention of 70%, manufacturer Dow Deutschland),
- ASP 10 (a membrane consisting of sulfonated polysulfone on polysulfone, having a permeability (25° C.) of 16 $l/(m^2h$ bar), NaCl-retention of 10%, manufacturer Advanced Membrane Technology),
- TS 40 (a membrane consisting of fully aromatic polyamide, having a permeability of (25° C.) of 5.6 $l/(m^2h$ bar), manufacturer TriSep),
- ASP 20 (a membrane consisting of sulfonated polysulfone on polysulfone, having a permeability (25° C.) of 12.5 $l/(m^2h$ bar), NaCl-retention of 20%, manufacturer Advanced Membrane Technology),
- UF-PES-4H (a membrane consisting of polyethersulfone on polypropylene, having a cut-off size of about 4000 g/mol, a permeability (25° C.) of 7 to 17 $l/(m^2h$ bar), manufacturer Hoechst),
- NF-PES-10 (a polyethersulfone membrane, having a cut-off size of 1000 g/mol, a permeability (25° C.) of 5 to 11 $l/(m^2h$ bar), NaCl-retention less than 15% (5 g/l), manufacturer Hoechst),
- NF45 (a membrane consisting of aromatic polyamide, having a permeability (25° C.) of 4.8 $l/(m^2h$ bar), NaCl-retention of 45%, manufacturer Dow Deutschland).

Furthermore, the following membranes are useful in the process of the invention:

- Desal-5 DK ( a four-layered membrane consisting of a polyester layer, a polysulfone layer and two proprietary layers, having a cut-off size of 150 to 300 g/mol, permeability (25° C.) of 5.4 $l/(m^2h$ bar) and $MgSO_4$-retention of 98% (2 g/l), manufacturer Osmonics),
- Desal-5 DL (a four-layered membrane consisting of a polyester layer, a polysulfone layer and two proprietary layers, having a cut-off size of 150 to 300 g/mol, permeability (25° C.) of 7.6 $l/(m^2h$ bar), $MgSO_4$-retention of 96% (2 g/l), manufacturer Osmonics),
- TFC S (a membrane consisting of modified aromatic polyamide; having a cut-off size of 200 to 300 g/mol, a permeability (25° C.) of 7.7 $l/(m^2h$ bar), NaCl-retention of 85% (2 g/l), manufacturer Fluid Systems).

EXAMPLE 1

The liquor to be treated was a maltose syrup having a maltose content of about 84% on RDS or about 7.6–7.8% on liquid weight, a maltotriose content of about 8.5 to 8.8 on RDS or about 0.8% on liquid weight and a dry substance content of about 9.2% by weight.

A batch mode nanofiltration with nine different nanofiltration membranes was carried out using a laboratory nanofiltration equipment consisting of rectangular cross-flow flat sheet modules with a membrane area of 0.0046 $m^2$. The nanofiltration equipment contained three nanofiltration elements in parallel, whereby three different membranes could be tested at the same time with the same feed. The feed volume in all tests was 20 liters. Before the nanofiltration, the membranes were washed with water.

The nanofiltration temperature was about 35° C. In the first three filtrations (tests 1 to 14), pH was between 6 and 7. In the fourth filtration (tests 15 to 19), pH was 4.5.

In the first filtration (tests 1 to 6), the pressure was gradually increased from 8 bar to 18 bar. The subsequent filtrations (tests 7 to 19) were made at a pressure of 18 bar. All tests were carried out with a cross-flow velocity of 6 m/s.

The contents of carbohydrates (maltotriose, maltose and glucose) on liquid weight (% of lw) and/or on RDS (% of RDS) were analyzed from the feed liquid before the nanofiltration, from the permeate obtained from the nanofiltration with nine different nanofiltration membranes and from the feed liquid after the nanofiltration (the retentate obtained from the nanofiltration). Furthermore, the contents of metal ions (Na, Ca) (mg/kg RDS) as well as the ratio of maltose to maltotriose were measured from the same samples. The results of the nanofiltration tests are set forth in Tables I and II.

The results of Tables I and II show that the tested membranes retained a higher proportion of maltotriose than maltose, resulting in a clear increase in the ratio of maltose to maltotriose in the permeate. The best results are obtained with NTR-7450 and Desal G10 membranes. For instance, with Desal G10 membrane, the ratio of maltose to maltotriose in the permeate is about 28-fold compared to the corresponding ratio in the feed before the nanofiltration. The results also show that oligosaccharides are almost completely retained by the nanofiltration membranes.

As a conclusion, maltotriose can thus be effectively separated from maltose using nanofiltration.

EXAMPLE 2

In this example, the liquor to be nanofiltered is an enzymatically saccharified maltose syrup containing over 70% maltose. The saccharification had been carried out with a combination of a pullulanase enzyme (Promozyme® 600 L, manufacturer Novo Nordisk A/S) in an amount of 1 l/t DS and a β-amylase enzyme (β-amylase 1500° Lintner, manufacturer Novo Nordisk A/S) in an amount of 1 kg/t DS at a temperature of 58° C. and at a pH of 5.5 for two days. The contents of maltose, maltotriose and glucose in the saccharified product appear from Table III (feed, % on DS).

The saccharified maltose syrup thus obtained is subjected to nanofiltration using a Desal G10 membrane at a pressure

TABLE I

| | 1<br>MA1-S1 | 2<br>MA1-B1 | 3<br>MA1-C1 | 4<br>MA1-S2 | 5<br>MA1-B2 | 6<br>MA1-C2 | 7<br>MA2-S2 | 8<br>MA2-PB | 9<br>MA2-PC | 10<br>MA2-S3 |
|---|---|---|---|---|---|---|---|---|---|---|
| Carbohydrates (HPLC with $Na^+$ form ion exchange column): | | | | | | | | | | |
| maltotriose (% of RDS) | 8.5 | 0.8 | 0.6 | 8.4 | 0.2 | 0.3 | 8.5 | 5.8 | 4.3 | 8.5 |
| maltose (% of Iw) | 7.62 | 0.30 | 1.53 | 7.80 | 0.21 | 1.14 | 7.67 | 0.27 | 2.88 | 7.88 |
| maltose (% of RDS) | 84.1 | 57 | 73.5 | 83.7 | 56 | 74.2 | 84.0 | 70 | 79.8 | 83.5 |
| glucose (% of RDS) | 6.2 | 37 | 17.2 | 6.2 | 36 | 20.2 | 6.2 | 14 | 10.0 | 6.1 |
| Ratio maltose/maltotriose | 10 | 69 | 132 | 10 | 250 | 283 | 10 | 12 | 18 | 10 |
| Increase in the ratio maltose/maltotriose (x-fold) | | 6.9 | 13.2 | | 25.0 | 28.3 | | 1.2 | 1.8 | |
| Metals (ICP) mg/kg RDS: | | | | | | | | | | |
| Na | 220 | 1610 | 580 | 215 | 1610 | 650 | 210 | 1840 | 300 | 210 |
| Ca | 110 | <190 | 100 | 110 | <259 | 90 | 110 | <259 | 60 | 130 |

| | | | |
|---|---|---|---|
| 1 | MA1-S1 | feed liquid | |
| 2 | MA1-B1 | Permeate 14 bar | NTR-7450 |
| 3 | MA1-C1 | Permeate 14 bar | Desal G10 |
| 4 | MA1-S2 | feed liquid | |
| 5 | MA1-B2 | Permeate for 18 bar | NTR-7450 |
| 6 | MA1-C2 | Permeate for 18 bar | Desal G10 |
| 7 | MA2-S2 | feed liquor at start | |
| 8 | MA2-PB | Permeate for 18 bar | NF200 |
| 9 | MA2-PC | Permeate for 18 bar | ASP 10 |
| 10 | MA2-S3 | feed liquor in the end | |

TABLE II

| | 11<br>MA3-S2 | 12<br>MA3-PA | 13<br>MA3-PB | 14<br>MA3-S3 | 15<br>MA4-S2 | 16<br>MA4-PA | 17<br>MA4-PB | 18<br>MA4-PC | 19<br>MA4-S3 |
|---|---|---|---|---|---|---|---|---|---|
| Carbohydrates (HPLC with $Na^+$ form ion exchange column): | | | | | | | | | |
| maltotriose (% of RDS) | 8.6 | 5.5 | 4.0 | 8.9 | 8.8 | 5.5 | 4.2 | 5.0 | 8.9 |
| maltose (% of Iw) | 7.72 | 2.30 | 2.13 | 7.91 | 7.70 | 5.85 | 3.06 | 1.70 | 7.85 |
| maltose (% of RDS) | 84.0 | 83.8 | 79.5 | 84.9 | 84.4 | 85.8 | 87.3 | 81.7 | 84.8 |
| glucose (% of RDS) | 6.1 | 8.7 | 12.1 | 6.1 | 6.1 | 7.5 | 9.6 | 8.3 | 6.1 |
| Ratio maltose/maltotriose | 10 | 15 | 20 | 10 | 10 | 16 | 21 | 16 | 10 |
| Increase in the ratio maltose/maltotriose (x-fold) | | 1.5 | 2.0 | | | 1.6 | 2.1 | 1.6 | |
| Metals (ICP) mg/kg RDS: | | | | | | | | | |
| Na | 210 | 470 | 410 | 215 | 210 | 220 | 330 | 430 | 240 |
| Ca | 120 | 135 | 40 | 130 | 80 | 90 | 130 | 100 | 120 |

| | | | |
|---|---|---|---|
| 11 | MA3-S2 | feed liquor at start | |
| 12 | MA3-PA | Permeate 18 bar | TS 40 |
| 13 | MA3-PB | Permeate 18 bar | ASP 20 |
| 14 | MA3-S3 | feed liquor in the end | |
| 15 | MA4-S2 | feed liquor at start | |
| 16 | MA4-PA | Permeate 18 bar | UF-PES-4H |
| 17 | MA4-PB | Permeate 18 bar | NF-PES-10 |
| 18 | MA4-PC | Permeate 18 bar | NF 45 |
| 19 | MA4-S3 | feed liquor in the end | |

of 18 bar. The dry substance content of the feed is 10%. The nanofiltration is carried out using the same equipment as in Example 1.

Table III shows the contents of maltotriose, maltose, glucose and polysaccharides with a polymerization degree higher than three (>DP3) of the feed and permeate obtained from the nanofiltration, calculated from the dry substance (DS) of the feed and permeate.

TABLE III

| Compound | Feed, % on DS | Permeate, % on DS |
|---|---|---|
| Maltotriose | 13.0 | 0.6 |
| Maltose | 72.0 | 95.5 |
| Glucose | 0.5 | 2.4 |
| >DP3 | 14.5 | 1.5 |

The foregoing general discussion and experimental examples are only intended to be illustrative of the present invention, and not to be considered as limiting. Other variations within the spirit and scope of this invention are possible and will present themselves to those skilled in the art.

What is claimed is:

1. A process for purifying a maltose-containing liquor from maltotriose, wherein said maltose-containing liquor has a maltose content of at least about 55% by weight, based on dissolved dry solids, comprising nanofiltrating said liquor and recovering as the permeate a maltose solution having an increased ratio of maltose to maltotriose.

2. The process as claimed in claim 1, comprising recovering a maltose solution having a ratio of maltose to maltotriose of over 1.1 times, preferably over 5 times, more preferably over 10 times and most preferably over 20 times that of the starting liquor.

3. The process as claimed in claim 1, comprising recovering a maltose solution having a ratio of maltose to maltotriose of 1.1 to 30 times, preferably 5 to 30 times, more preferably 10 to 30 times and most preferably 20 to 30 times that of the starting liquor.

4. The process as claimed in 1, wherein the starting liquor has a maltose content of at least about 80% by weight, based on dissolved dry solids.

5. The process as claimed in claim 1, wherein the starting liquor has a maltose content of 55 to 90% by weight, preferably 80 to 90% by weight, based on dissolved dry solids.

6. The process as claimed in claim 1, wherein the starting maltose-containing liquor is a maltose syrup.

7. The process as claimed in claim 1, wherein the process also comprises one or more pretreatment steps.

8. The process as claimed in claim 7, wherein the pretreatment steps are selected from ion-exchange, ultrafiltration, chromatography, concentration, pH adjustment, filtration and combinations thereof.

9. The process as claimed in claim 1, wherein nanofiltration is carried out at a pH of 1 to 8, preferably 4 to 8, most preferably 4.5 to 7.0.

10. The process as claimed in claim 1, wherein nanofiltration is carried out at a pressure of 10 to 50 bar, preferably 15 to 35 bar.

11. The process as claimed in claim 1, wherein nanofiltration is carried out at a temperature of 5 to 95° C., preferably 30 to 60° C.

12. The process as claimed in claim 1, wherein nanofiltration is carried out with a flux of 10 to 100 $l/m^2h$.

13. The process as claimed in claim 1, wherein nanofiltration is carried out using a nanofiltration membrane selected from polymeric and inorganic membranes having a cut-off size of 100 to 2500 g/mol.

14. The process as claimed in claim 13, wherein the cut-off size of the nanofiltration membrane is 500 to 2500 g/mol.

15. The process as claimed in claim 13, wherein the nanofiltration membranes are ionic membranes.

16. The process as claimed in claim 13, wherein the nanofiltration membrane is selected from cellulose acetate membranes, aromatic polyamide membranes, polysulfone membranes, sulfonated polysulfone membranes, polyether sulfone membranes, sulfonated polyether sulfone membranes, polyester membranes and polypiperazine membranes and combinations thereof.

17. The process as claimed in claim 16, wherein the nanofiltration membrane is selected from aromatic polyamide/polysulfone membranes and sulfonated polyether sulfone membranes.

18. The process as claimed in claim 13, wherein the nanofiltration membrane is selected from an aromatic polyamide/polysulfone membrane having a cut-off-size of about 2500 g/mol, permeability (25° C.) of 3.4 $l/(m^2h$ bar), NaCl retention of 10%, and retention of dextrane (1500 g/ml) of glucose of 50% and a sulfonated polyethersulfone membrane having a cut off size of about 500 to about 1000 g/mol, permeability (25° C.) of about 9.4 $l/(m^2h$ bar), and NaCl retention of about 51% (about 5 g/l).

19. The process as claimed in claim 13, wherein the form of the nanofiltration membrane is selected from sheets, tubes, spiral membranes and hollow fibers.

20. The process as claimed in claim 13, wherein the nanofiltration membrane has been pretreated by washing.

21. The process as claimed in claim 20, wherein the washing agent is selected from water, ethanol and/or an alkaline detergent.

22. The process as claimed in claim 1, wherein the nanofiltration process is repeated at least once.

23. The process as claimed in claim 1, wherein the process is carried out batch wise or continuously.

24. The process as claimed in claim 1, wherein the process is carried out using a nanofiltration equipment including several nanofiltration elements arranged in parallel or series.

25. The process as claimed in claim 1, wherein the process also comprises one or more post-treatment steps.

26. The process as claimed in claim 25, wherein the post-treatment steps are selected from chromatography, concentration, color removal and crystallization.

27. The process as claimed in claim 1, comprising simultaneously recovering as the permeate a maltose solution enriched in glucose.

28. The process as claimed in claim 27, wherein the process comprises a further step of separating the glucose from the permeate.

29. The process as claimed in claim 28, wherein the separation process is selected from nanofiltration and chromatography.

30. The process as claimed in claim 1, comprising simultaneously recovering as the permeate a solution deprived of oligosaccharides.

31. The process as claimed in claim 1, wherein the process comprises a further step of recovering as the retentate a solution enriched in oligosaccharides.

32. A foodstuff comprising the maltose product prepared by the process according to claim 1.

33. The foodstuff as claimed in claim 32, wherein the maltose product is in the form of maltose syrup.

34. The process as claimed in claim 1, wherein the process further comprises converting the maltose present in said maltose solution to maltitol.

35. The maltitol product prepared by the process as claimed in claim 34.

36. The process as in claim 34, wherein said conversion is carried out by catalytic hydrogenation.

37. The maltitol product prepared by the process as claimed in claim 36.

38. The process as claimed in claim 34, wherein the process further comprises separation of glucose after said conversion of maltose to maltitol.

39. The maltitol product prepared by the process as claimed in claim 38.

40. The process as claimed in claim 34, wherein the process further comprises separation of glucose before said conversion of maltose to maltitol.

41. The maltitol product prepared by the process as claimed in claim 40.

42. The process as claimed in claim 34, wherein the process further comprises crystallizing the maltose present in said maltose solution to obtain crystalline maltose and converting said crystalline maltose to maltitol.

43. The maltitol product prepared by the process of claim 42.

* * * * *